US010537054B2

(12) United States Patent
Roberge et al.

(10) Patent No.: US 10,537,054 B2
(45) Date of Patent: Jan. 21, 2020

(54) DYNAMIC BAFFLE FOR AIR FLOW BALANCING BETWEEN ADJACENT PRODUCT LINES

(71) Applicant: CNH Industrial Canada, Ltd., Saskatoon (CA)

(72) Inventors: Martin J. Roberge, Saskatoon (CA); Joel Denis, Saskatoon (CA); Rex L. Ruppert, Benson, MN (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/652,784

(22) Filed: Jul. 18, 2017

(65) Prior Publication Data

US 2019/0021214 A1    Jan. 24, 2019

(51) Int. Cl.
| | | |
|---|---|---|
| *B65G 53/52* | (2006.01) |
| *A01C 7/08* | (2006.01) |
| *B05B 7/14* | (2006.01) |
| *B05B 13/00* | (2006.01) |
| *A01C 15/04* | (2006.01) |

(52) U.S. Cl.
CPC ............ *A01C 7/082* (2013.01); *B05B 7/1477* (2013.01); *B05B 7/1486* (2013.01); *B05B 13/005* (2013.01); *A01C 15/04* (2013.01)

(58) Field of Classification Search
CPC ...... B65G 51/14; B65G 53/56; B65G 53/528; A01C 7/082; A01C 15/04; Y10T 137/87812; F16L 41/023
USPC ......... 406/11, 120, 124, 159, 160, 161, 181, 406/183; 111/174; 137/875
See application file for complete search history.

(56) References Cited

U.S. PATENT DOCUMENTS

| | | | |
|---|---|---|---|
| 1,905,733 A | | 3/1932 | Moore |
| 3,189,230 A | * | 6/1965 | Gillespie ................ A01C 7/081 111/73 |
| 3,272,456 A | * | 9/1966 | Hoehmann ............ B65G 51/24 406/183 |
| 3,331,394 A | * | 7/1967 | Hefler .................... F16K 11/16 137/601.05 |

(Continued)

FOREIGN PATENT DOCUMENTS

DE    102004038258    3/2006

*Primary Examiner* — Joseph A Dillon, Jr.
(74) *Attorney, Agent, or Firm* — Rebecca L. Henkel; Rickard K. DeMille

(57) ABSTRACT

The present invention is directed to an applicator having an agricultural product pneumatic conveying system which meters particulate material from one or more source containers at the application equipment and transports the particulate material to evenly distribute the particulate material from the applicator. The pneumatic conveying system employs supply lines connected between the metering devices at the source containers and delivery nozzles. The conveying system also includes a dynamic baffle system that directs the air flow towards a supply line detected as having increased resistance to the air flow in order to equalize the air flow into each of the supply lines. The baffle system accomplishes this by obstructing a portion of the air flow towards a supply line having less resistance to the air flow and concurrently re-directing the obstructed portion of the air flow into the supply line with higher air flow resistance.

12 Claims, 6 Drawing Sheets

(56) References Cited

U.S. PATENT DOCUMENTS

Figure 1:
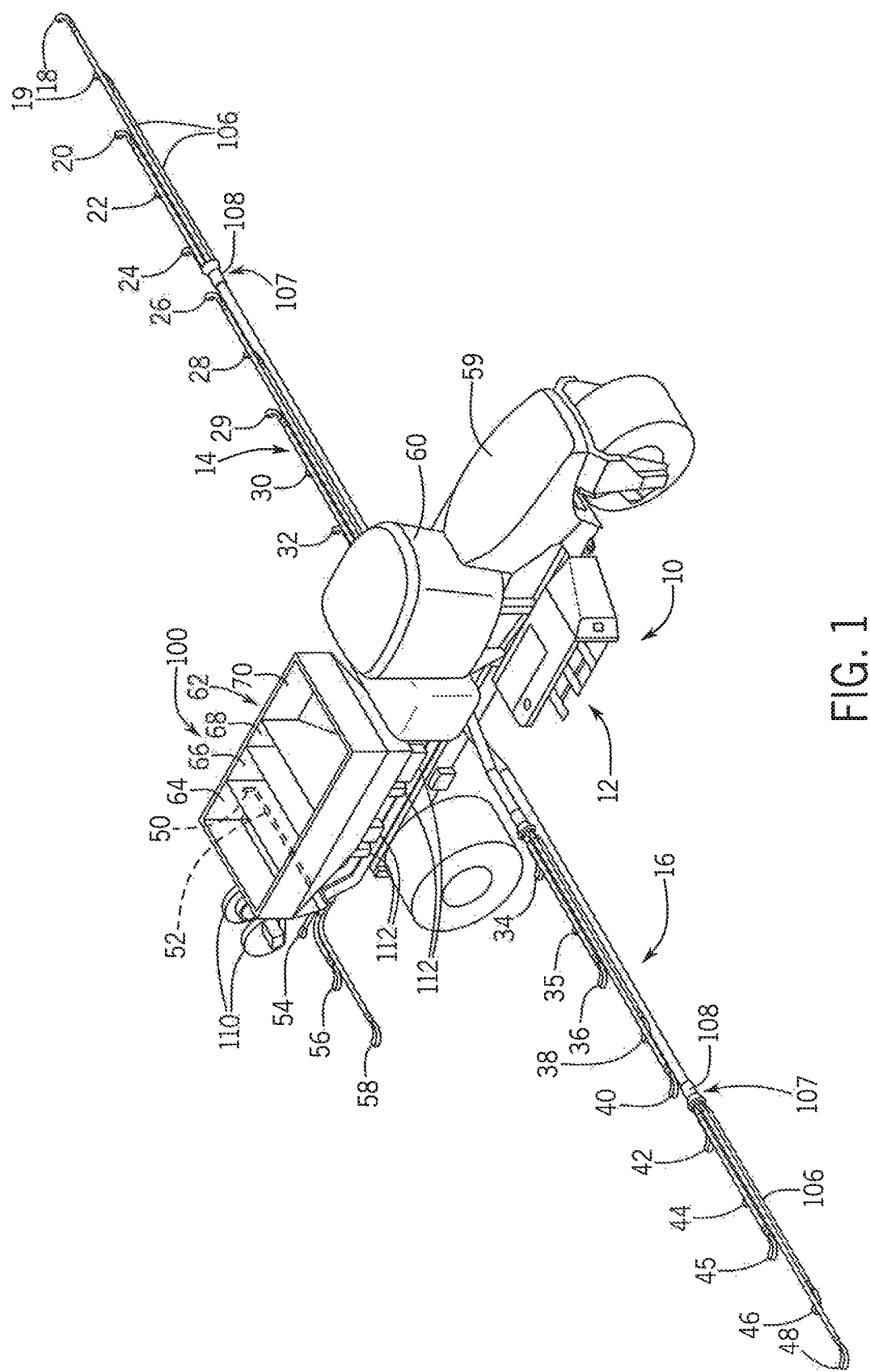

| | | | | |
|---|---|---|---|---|
| 3,334,947 A * | 8/1967 | Orsi | ............... | A24C 5/392 |
| | | | | 406/183 |
| 3,342,198 A | 9/1967 | Groeber | | |
| 3,451,725 A * | 6/1969 | Waldrop | ............... | A01D 43/087 |
| | | | | 406/161 |
| 3,545,470 A * | 12/1970 | Hamilton | ............... | B65G 53/56 |
| | | | | 137/101 |
| 3,690,341 A | 9/1972 | Sutko | | |
| 3,860,031 A * | 1/1975 | Grilli | ............... | A24C 5/391 |
| | | | | 131/110 |
| 4,156,439 A * | 5/1979 | Jeffries | ............... | F16K 11/0525 |
| | | | | 137/625.46 |
| 4,241,760 A | 12/1980 | Mon | | |
| 4,480,794 A * | 11/1984 | Fuss | ............... | A01C 7/084 |
| | | | | 239/654 |
| 4,553,882 A | 11/1985 | Knappertz | | |
| 4,697,686 A * | 10/1987 | West | ............... | B65G 53/56 |
| | | | | 193/23 |
| 4,709,860 A | 12/1987 | Patrick et al. | | |
| 4,779,765 A * | 10/1988 | Neumeyer | ............... | A01C 7/06 |
| | | | | 111/174 |
| 4,872,785 A * | 10/1989 | Schrage | ............... | A01C 7/081 |
| | | | | 406/155 |
| 5,161,912 A * | 11/1992 | Schlueter | ............... | A01G 25/16 |
| | | | | 137/875 |
| 5,265,547 A * | 11/1993 | Daws | ............... | A01C 7/087 |
| | | | | 111/175 |
| 5,333,640 A | 8/1994 | Swift et al. | | |
| 5,485,975 A * | 1/1996 | Tindell | ............... | B64D 29/00 |
| | | | | 137/486 |
| 5,775,585 A * | 7/1998 | Duello | ............... | A01C 15/04 |
| | | | | 239/654 |
| 5,899,805 A * | 5/1999 | Dowd | ............... | B64D 13/00 |
| | | | | 137/875 |
| 5,915,313 A | 6/1999 | Bender et al. | | |
| 5,979,343 A * | 11/1999 | Gregor | ............... | A01C 7/081 |
| | | | | 111/175 |
| 6,182,699 B1 | 2/2001 | Hawkes | | |
| 6,263,883 B1 * | 7/2001 | Furmanski | ............ | A24C 5/323 |
| | | | | 131/282 |
| 6,644,225 B2 | 11/2003 | Keaton | | |
| 6,644,352 B1 | 11/2003 | Pfetzer | | |
| 7,213,525 B2 | 5/2007 | Meyer et al. | | |
| 7,290,566 B1 * | 11/2007 | Young | ............... | F16K 11/052 |
| | | | | 137/875 |
| 7,640,877 B1 | 1/2010 | Memory | | |
| 7,669,538 B2 * | 3/2010 | Memory | ............... | A01C 7/082 |
| | | | | 111/174 |
| 7,975,824 B1 * | 7/2011 | Nolin | ............... | B65G 53/56 |
| | | | | 193/31 A |
| 8,522,700 B2 | 9/2013 | Landphair | | |
| 8,656,848 B2 | 2/2014 | Hubalek et al. | | |
| 8,770,120 B2 | 7/2014 | Naylor | | |
| 8,950,260 B2 | 2/2015 | Gelinske et al. | | |
| 9,471,086 B1 * | 10/2016 | Webb | ............... | F16K 11/052 |
| 10,285,324 B2 * | 5/2019 | Gilstring | ............... | A01C 7/082 |
| 2001/0047834 A1 | 12/2001 | Menin et al. | | |
| 2003/0161694 A1 * | 8/2003 | Bauver | ............... | B65G 53/528 |
| | | | | 406/1 |
| 2008/0159818 A1 * | 7/2008 | Kato | ............... | B65G 53/56 |
| | | | | 406/183 |
| 2008/0302991 A1 | 12/2008 | Tseng | | |
| 2009/0165686 A1 * | 7/2009 | Memory | ............... | A01C 7/082 |
| | | | | 111/175 |
| 2011/0311322 A1 * | 12/2011 | Jost | ............... | A01C 7/082 |
| | | | | 406/181 |
| 2013/0008543 A1 * | 1/2013 | Kaminsky | ............ | F16K 11/052 |
| | | | | 137/861 |
| 2013/0263947 A1 * | 10/2013 | Liang | ............... | F04D 13/00 |
| | | | | 137/565.11 |
| 2014/0158033 A1 * | 6/2014 | Jagow | ............... | A01C 7/082 |
| | | | | 111/174 |
| 2017/0258003 A1 * | 9/2017 | Henry | ............... | A01C 7/084 |
| 2018/0343792 A1 * | 12/2018 | Roberge | ............ | A01C 15/04 |
| 2019/0071266 A1 * | 3/2019 | Roberge | ............ | B65G 53/528 |

\* cited by examiner

DYNAMIC BAFFLE FOR AIR FLOW BALANCING BETWEEN ADJACENT PRODUCT LINES

FIELD OF THE DISCLOSURE

The present invention relates generally to agricultural equipment, and, more particularly, to an agricultural product delivery system on an application implement, such as a planter, seeder or fertilizer application equipment, for applying particulate material such as seed, fertilizer, herbicide or insecticide in a field, either as a surface application or deposited in the soil to improve soil quality.

BACKGROUND OF THE DISCLOSURE

Agricultural product delivery systems are known to utilize various mechanisms, including mechanical and/or pneumatic systems, i.e., a flow of air, to assist in the delivery and movement of particulate material or product such as fertilizer, seed, insecticide or herbicide from a product supply chamber through an interior passage provided by a series of elongate tubes which extend from the product supply chamber to a product applicator that places the product on or in growing medium, such as soil. Such agricultural product delivery systems are commonly employed in planters, air drills, fertilizer and pesticide applicators and a variety of other agricultural implements.

Agricultural implements that employ an agricultural product delivery system are known to have a particulate material supply source such as one or more tanks that are loaded with the particulate material or materials to be applied. The tanks have or are associated with a metering device, which typically consists of a rotating element, which meters the particulate materials from the tanks into a set of distribution channels, such as conduits, hoses, etc., for application to the farm field. In most systems, a pneumatic source such as a fan or blower provides air to convey and distribute material through the distribution channels. Once the metering of particulates is done and the mix of air and particulates is in the distribution channels, the solid concentration should remain nearly constant and in dilute phase.

Systems as described have provided certain advantages and have worked acceptably in some aspects, but are not without disadvantages, inefficiencies or inconveniences. For example, it is desirable to use a material supply source, such as a tank, with different applicator equipment by, for example, coupling the tanks with a planter for planting seed, and later coupling the same tank equipment with an applicator for applying needed pesticides and/or fertilizer.

However, with pneumatic conveying or delivery systems, the pressure drop across various portions of the delivery system can often result in different rates of the particulate material being dispensed from different supply lines and associated nozzles. It is often difficult to equalize airflow between parallel supply lines fed by the same air flow source, or fan as the supply lines may have different air flow resistances caused for various reasons within the supply lines. As a result, the air flow is often directed to the supply line with the least resistance, i.e., preferential flow, when the metering devices for the supply lines cease injecting particles into the supply lines, such as for sectional control, or injecting particles at a reduced rate, such as for turning compensation. Alternatively, as a result of its position or configuration, the air flow source/fan may simply direct air flow primarily towards one side of the conveying system.

What is needed in the art is a pneumatic agricultural product conveying system which improves efficiency and convenience of the applicator without further complicating its construction and that provides a more even distribution of the air flow from the air flow source across all supply lines and nozzles of the system.

SUMMARY OF THE DISCLOSURE

According to one aspect of the present disclosure, an applicator includes an agricultural product pneumatic conveying system which transfers particulate material from one or more source containers to application equipment on demand, and meters the material at the application equipment. The system includes a number of individual distribution channels or supply lines that are each interconnected with a number of product storage chambers within a tank. An air flow device is connected to a plenum that directs the air flow from the fan to the various supply lines that are connected to the plenum in order to allow particulate material collected in the supply lines from each of the chambers to be mixed within the supply lines while being directed to different sections of the booms extending outwardly from the applicator. The individual supply lines connected between the air flow source and each section of the booms enable the lines to maintain a relatively constant, static pressure along the entire section, thus providing an independently controllable distribution stream of the particulate material across each section.

When resistance is encountered in one or more of the supply lines during operation of the pneumatic conveying system, the plenum additionally includes a dynamic baffle system disposed within the plenum. The dynamic baffle system directs the air flow towards a supply line detected as having increased resistance to the air flow in order to equalize the air flow into each of the supply lines. The baffle system accomplishes this by obstructing a portion of the air flow towards a supply line having less resistance to the air flow and concurrently re-directing the obstructed portion of the air flow into the supply line with higher air flow resistance. The operation of the dynamic baffle system can continue until the air flow resistance within the supply lines is equalized, at which time the dynamic baffle system is reconfigured to allow equal air flow to all supply lines.

According to another aspect of the invention, agricultural product delivery system, is provided including at least one particulate material supply compartment, a number of delivery units for applying particulate material from the supply compartment and a pneumatic conveying system providing a mixed flow of particulate material from the at least one particulate material supply compartment to the particle delivery units, the conveying system including an airflow source, a number of supply lines each operably connected to the airflow source at one end, to the at least one particulate material supply compartment and to at least one of the particle delivery units at the opposite end and a dynamic baffle system disposed between air flow source and the number of supply lines.

According to another aspect of the present invention, a dynamic baffle system for a pneumatic agricultural product delivery system including an air flow source and a number of supply lines is provided including a plenum interconnected between the air flow source and the number of supply lines and at least one baffle rotatably mounted within an interior of the plenum.

According to a further aspect of the present invention, a method of delivering a number of agricultural products from a number of compartments containing the number of products to a number of particle delivering units applying the particles in a field includes the steps of supplying the number of agricultural products from the number of compartments to the pneumatic conveying system of claim 1, adjusting the air flow equally though the number of supply lines using the at least one dynamic baffle system, mixing the agricultural product in the pneumatic conveying system to form a mixed product, conveying the mixed product to the particle delivering units and applying the mixed product in an agricultural field.

Numerous additional objects, aspects and advantages of the present invention will be made apparent from the following detailed description taken together with the drawing figures.

BRIEF DESCRIPTION OF THE DRAWINGS

The drawings illustrate the best mode of practicing the present disclosure.

In the drawings:

FIG. 1 is an isometric view of an agricultural application implement, in the nature of a fertilizer spreader, having a pneumatic conveying system according to one exemplary embodiment of the invention.

FIG. 2 is a side elevation view of the fertilizer spreader shown in FIG. 1

FIG. 3 is bottom plan view of the pneumatic conveying system according to another exemplary embodiment of the invention.

FIG. 4 is an isometric view of a pneumatic conveying system on a fertilizer spreader according to another exemplary embodiment of the invention.

FIG. 5 is a partially broken away, top plan view of a dynamic baffle system according to an exemplary embodiment of the invention in a neutral configuration.

FIG. 6 is a partially broken away, top plan view of the dynamic baffle system of FIG. 5 in an adjustment configuration.

FIG. 7 is a partially broken away, top plan view of a dynamic baffle system according to another exemplary embodiment of the invention in a neutral configuration.

FIG. 8 is a partially broken away, top plan view of the dynamic baffle system of FIG. 7 in an adjustment configuration.

FIG. 9 is a front elevation view of the dynamic baffle system of FIG. 5.

FIG. 10 is an isometric view of a dampener for the dynamic baffle system of FIG. 5.

DETAILED DESCRIPTION OF THE DISCLOSURE

Referring now to the drawings, and more particularly to FIGS. 1-3, there is shown an agricultural application implement 10, on which a pneumatic conveying system 100 can be used. In the exemplary embodiment shown, application implement 10 is a granular fertilizer applicator 10. As is known in the art, applicator 10 generally includes a large tired transport unit 12 such as truck or tractor, and laterally extending particle delivery booms 14 and 16, which may be pivoted to a stowed position close to the implement for storage or transport. Each boom 14, 16 includes a plurality of boom tubes or conduits terminating at the outboard end in a particle delivering unit, which for fertilizer applicator 10 are a spreading outlet or nozzle. In the exemplary embodiment shown, boom 14 includes ten nozzles 18, 19, 20, 22, 24, 26, 28, 29, 30 and 32; and boom 16 includes ten nozzles 34, 35, 36, 38, 40, 42, 44, 45, 46 and 48. Additionally, at the back of applicator 10 there are five rear nozzles 50, 52, 54, 56 and 58 to provide full and complete coverage across the width of implement 10, including the area between the inboard-most nozzles 32 and 34 of booms 14, 16. Implement transport unit 12 is self-propelled by an engine in an engine compartment 59 and includes an operator cab 60. In the exemplary embodiment shown, an uncovered tank 62 includes compartments 64 and 70 for carrying particulate material to be distributed to and disbursed by nozzles 18-58. Further smaller compartments 66, 68 can be provided to supply micro-nutrients or other materials to nozzles 18-58. The supply of particulate material in compartments 64, 66, 68, 70 is replenished periodically from a still larger volume supply vehicle (not shown).

Fertilizer applicator 10 is illustrative of the types of equipment for which the pneumatic conveying system 100 can be used; however, it should be understood that the pneumatic conveying system 100 may, of course, be employed in conjunction with other agricultural equipment such as tillage, seeding or planting devices, and is useful in distributing particulate material other than fertilizer.

Looking now at FIGS. 1-3, in the illustrated exemplary embodiment the compartments 64-70 of the tank 62 are each disposed directly above a pneumatic conveying system or assembly 100. The system 100 includes five large diameter supply lines 102, which in certain exemplary embodiments are between 2"-10" in diameter, and in other exemplary embodiments are between 4.5"-5" in diameter, that extend from a plenum 104 at one end, under the compartments 64-70 and terminate at the booms 14, 16 or at the rear nozzles 50-58. At the booms 14, 16, the supply lines 102 and the particulate material or product transported therein can be split by a suitable distribution structure or mechanism 107, such as a horizontal rotary distributor(s) 108, among or into a number of secondary or smaller supply lines 106, which in certain exemplary embodiments are between 1.5"-4" in diameter, and in other exemplary embodiments are between 2.5"-3" in diameter, that are connected to the nozzles 18-58.

To collect and drive the particulate material along the lines 102, in the illustrated embodiment one or more fans 110 are operably connected to the plenum 104 opposite the lines 102. The air flow from the fans 110 is directed from the fans 110 through the plenum 104 and into the respective lines 102 as a result of the structure of the plenum 104. After the air flow passes through the one or more plenums 104 connected to the one or more fans 110 and collects/entrains the particulate material from the compartments 64-70 in a manner to be described, the air flow continues to flow along each of the four (4) large diameter lines 102 that make approximately a 90° turn to connect to the booms 14, 16.

In order to spread the particulate material/product over/onto the center section over which the machine 10 passes, a large line 102 must move product to the rear nozzles 50-58 where there is no interference by the machine 10 on the spread pattern. To accomplish this a line 102 carrying only air is added on the side of the machine 10 and has a forward section 105 that extends from the plenum 104 to the front of the machine 10. At the front of the machine 10, one particular line 102 turns 180° and has a rearward section 109 that passes beneath the compartments 64-70 where the line 102 collects the particulate material/product and transports the product to the nozzles 50-58 at the rear of the machine 10.

In a different configuration the line 102 which carries air to the front could be placed between the frame rails (not shown) of the machine 10 or in any other suitable location that can accommodate the line 102. In the illustrated exemplary embodiment two large diameter lines 102 are stacked vertically on top of each other in order to provide more rigidity to the support structure formed by the lines 102 upon reaching the booms 14,16. However, this configuration could be changed to a horizontal arrangement of the lines 102 which would result in less bends and a more uniform nozzle height along the booms 14,16.

Figure 2:
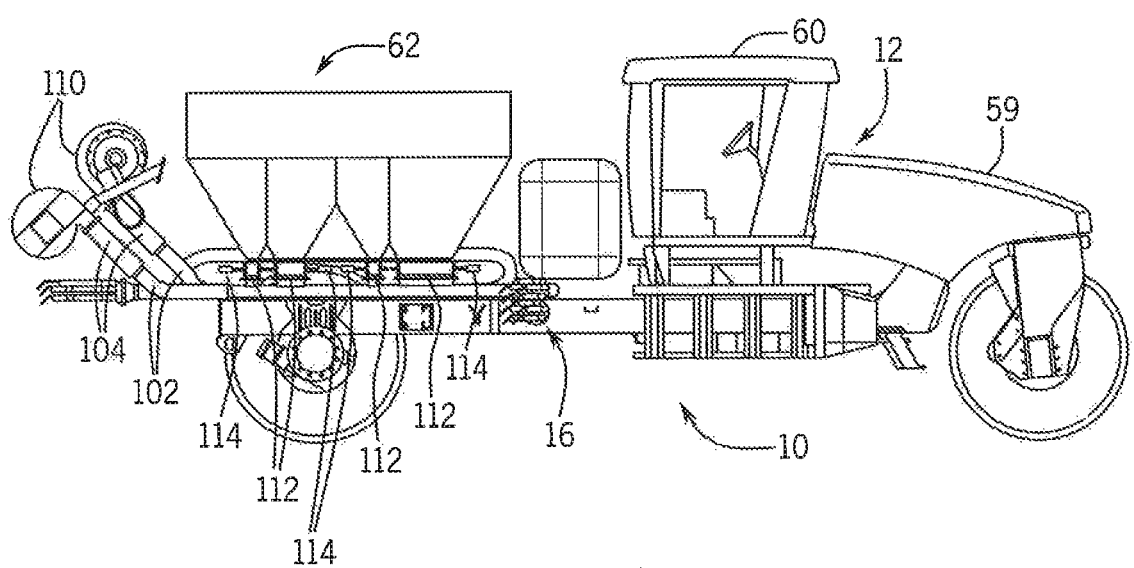
Figure 3:
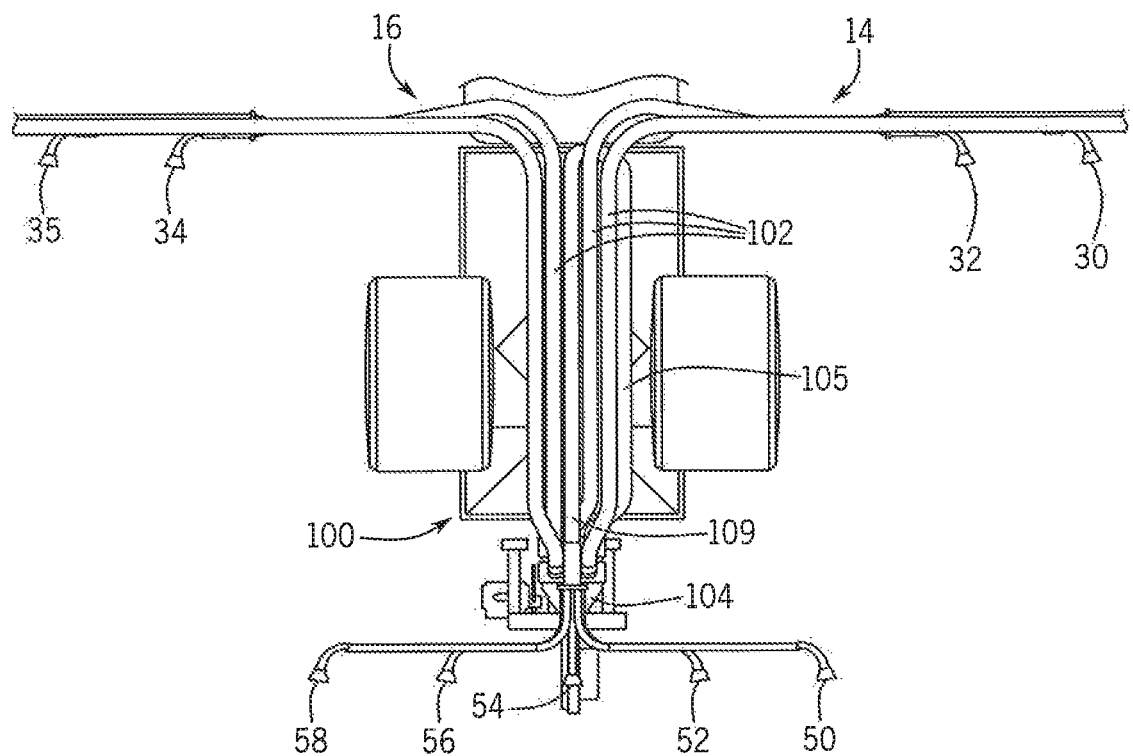
Figure 4:
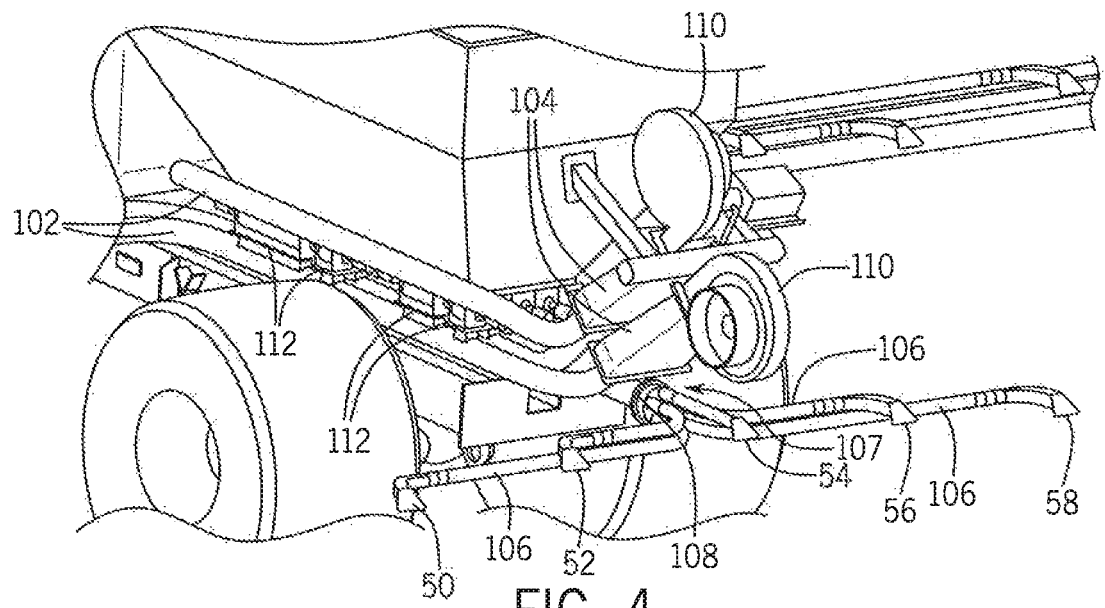

Referring now to FIGS. 2 and 4, in the illustrated exemplary embodiment the particulate material/product contained within each of the compartments 64-70 of the tank 62 is introduced into the airflow in the various lines 102 via airtight product metering devices, that in an exemplary embodiment take the form of rotary airlocks 112 that function to meter the product flowing from the compartments 64-70 into each line 102. The airlocks 112 provide a mechanical airtight barrier between the pressure differential created from the large diameter line 102 and the tank 62 since the tank 62 and the individual compartments 64-70 within the tank 62 are not pressurized. To operate the airlocks 112, in the illustrated exemplary embodiment the airlocks 112 are operably connected to one or more hydraulic motor(s) 114 that are independently controllable by the operator of the machine 10, in order to control the flow rate of the individual particulate material/product being dispensed from the nozzles 18-48 and 50-58. However, in alternate configurations for the machine 10 and/or the pneumatic system 100, electric or pneumatic motors (not shown) can be utilized in place of the hydraulic motor(s) 114.

Figure 6:
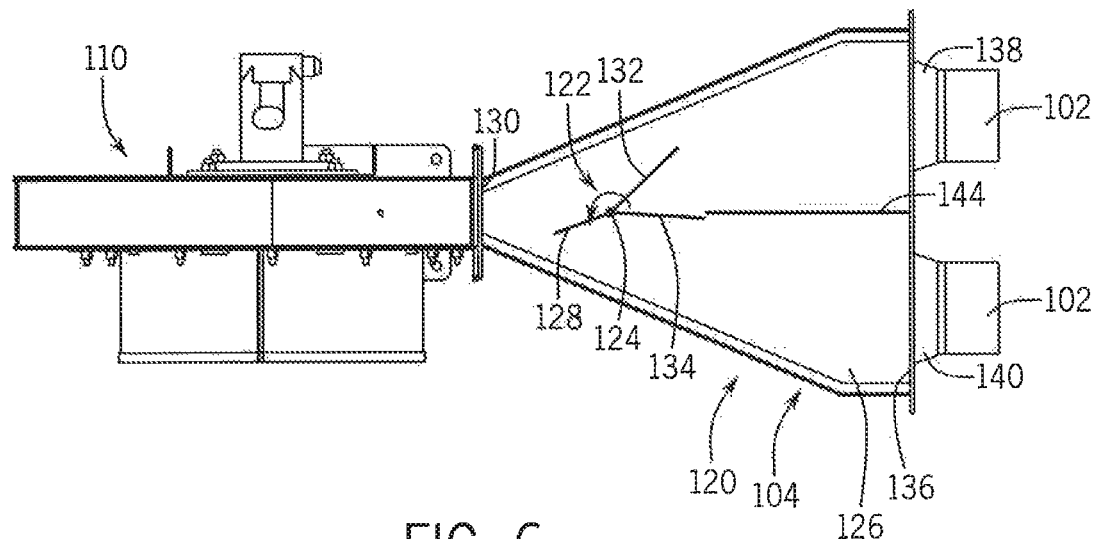
Figure 7:
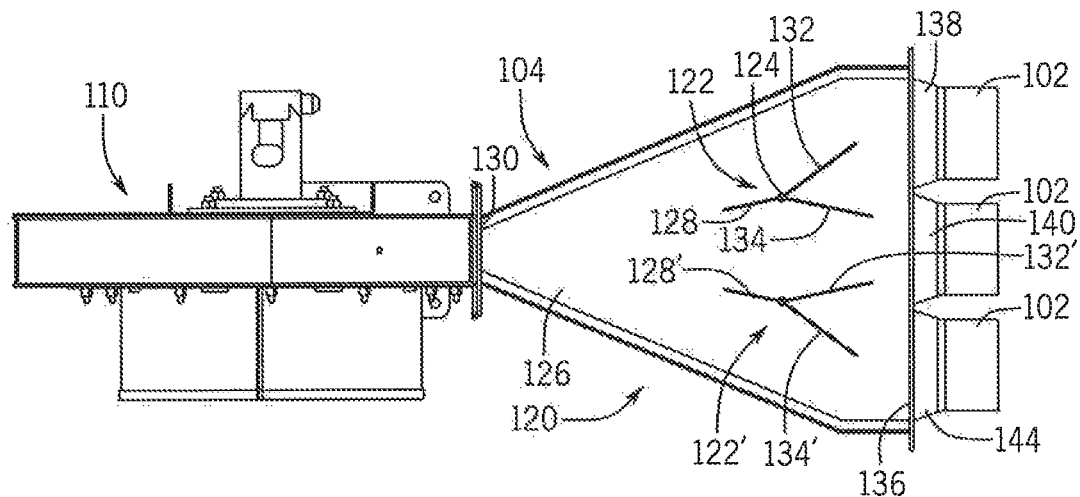
Figure 8:
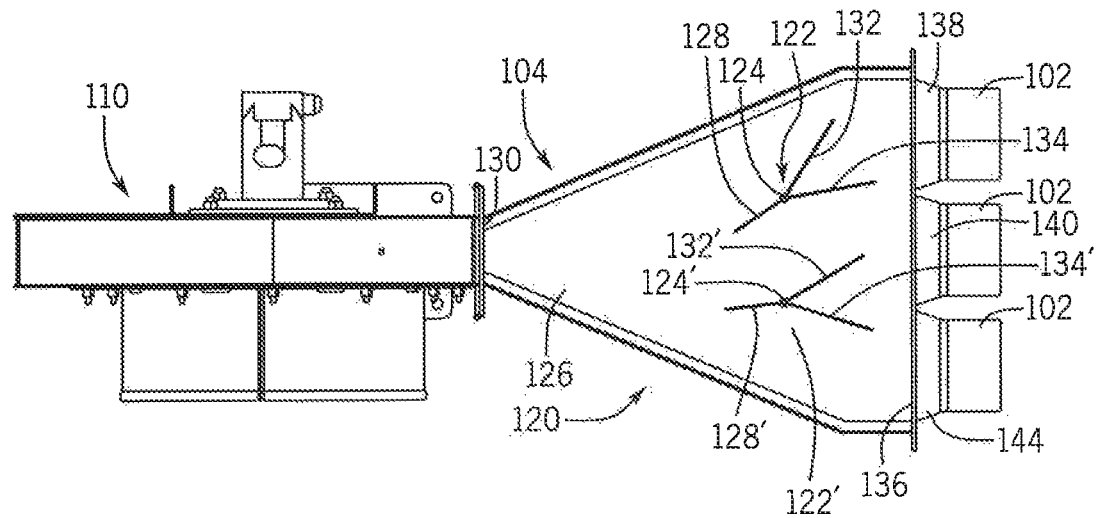

Looking now at FIGS. 1, 2 and 4, in the illustrated exemplary embodiment the plenums 104 provide airflow from the fans 110 to all five lines 102 of the system 100, with one plenum 104 connected to the two (2) outside lines 102 (FIGS. 5 and 6), with the other plenum 104 supplying the air flow to the center three (3) lines 102 (FIGS. 7 and 8). The lines 102 are split in this fashion because of the higher pressure drop associated with the outermost lines 102 as a result of their length. With only the two higher pressure lines supplied by one plenum 104, it allows the fan 110 connected to the longer lines 102 to supply a higher pressure airflow through these lines 102 since less airflow is required for two lines 102 vs. three lines 102. In the illustrated exemplary embodiment, the two fans 110 and associated plenums 104 are stacked vertically with respect to one another. However a different configuration can be utilized where the fans 110 and plenums 104 are arranged in the same horizontal plane in order to minimize the space requirements, with the plenums 104 also optionally being rotated 90° from the illustrated configuration.

Figure 5:
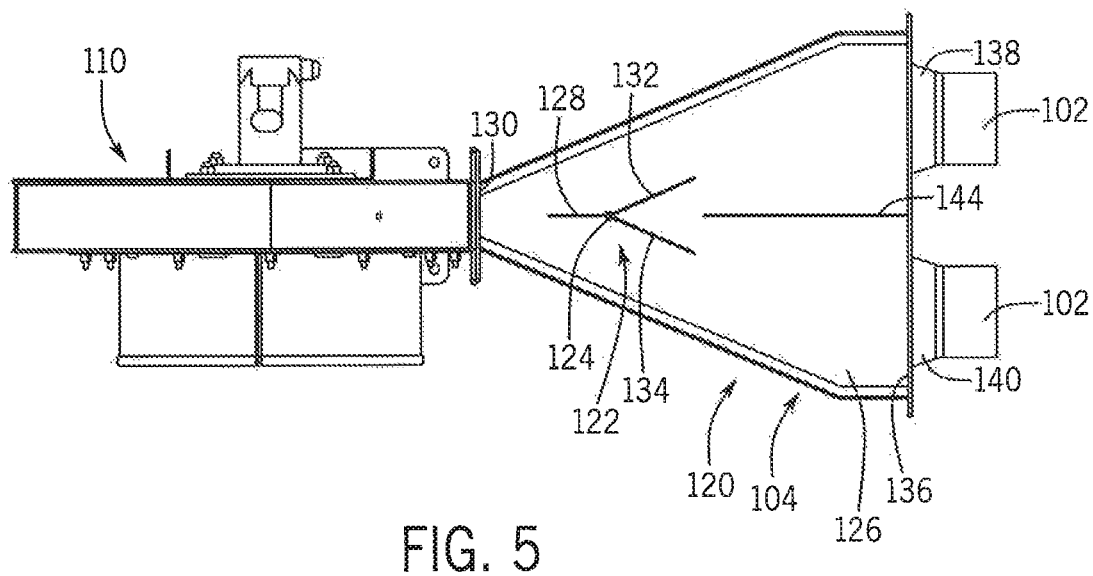
Figure 9:
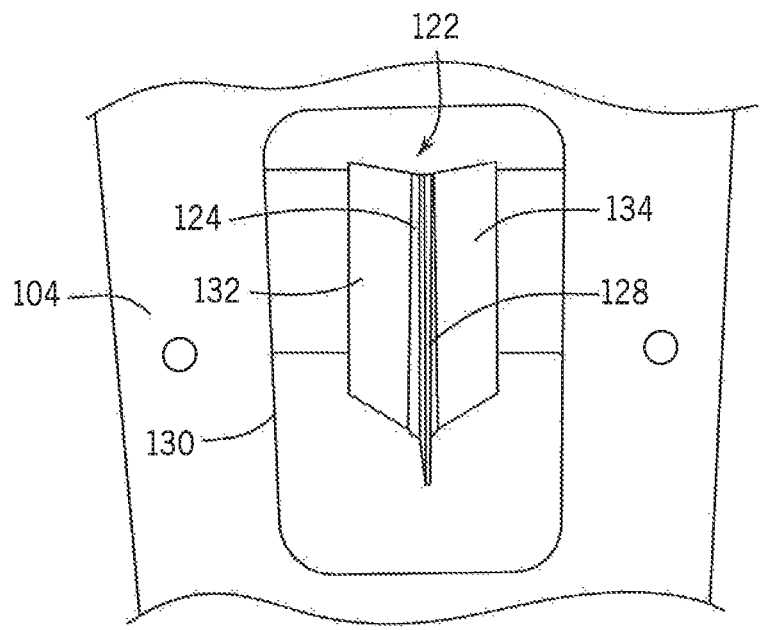

Looking now at the exemplary embodiment of FIGS. 5-6 and 9, to accommodate different resistances occurring for various reasons in the supply lines 102 that cause preferential airflow to the supply line(s) 102 with the least resistance, a dynamic baffle system 120 is located within the plenums 104. The dynamic baffle system 120 operates to increases the resistance of the supply line 102 that is receiving more airflow from the air flow source 110 due to the increased resistance in another supply line(s) 102. Further, if unequal air flow between the supply lines 102 is caused not by resistance within the lines 102 but because the fan 110 is not distributing the air evenly, the dynamic baffle system 120 can increase the air flow resistance at the supply line 102 where the fan is directing most of the air flow to equalize the air flow across each of the supply lines 102. In FIGS. 5 and 9, the system 120 includes a dynamic baffle 122 disposed within the plenum 104 that reduces the area within the plenum 104, increases the pressure drop across the plenum 104 and is capable of rotating within the plenum 104 on a vertical axis. The baffle 122 includes a central shaft 124 rotatably mounted across the interior 126 of the plenum 104 that defines the vertical axis and extends between upper and lower walls of the plenum 104. The shaft 124 can be rotatably mounted to or around a separate pivot rod (not shown) connected to the plenum 104, or the shaft 124 itself can be rotatably mounted to the plenum 104. The baffle 122 includes a forward vane 128 that extends in a direction towards the narrow inlet end 130 of the plenum 104 and a pair of rearward vanes 132,134 that extends outwardly from the central shaft 124 at angles relative to the forward vane 128 and to one another toward the wide outlet end 136 of the plenum 104 including outlets 138,140 operably connected to the supply lines 102. The system 120 can also include a separator plate 144 that is positioned on the outlet end 136 between the outlets 138,140 in alignment with the forward vane 128 to isolate the air flows downstream of the baffle 122. The upper and lower ends of the vanes 128,132,134 on the baffle 122 are each spaced at least a small distance from the upper and lower walls of the plenum 104 in order to enable the baffles 122 and vanes 128,132,134 to rotate freely without contacting the walls of the plenum 104.

When air flow resistance is generally equal in both supply lines 102, and/or when air flow from the fan 110 is directed evenly between the supply lines 102, the dynamic baffle 122 remains neutral on the center axis in the configuration of FIG. 5. However, as shown in the exemplary embodiment of FIG. 6, if outlet 140 receives more airflow due to a smaller resistance in the attached supply line 102, or if the fan 110 directs greater air flow towards outlet 140, the increased air flow towards outlet 140 will contact the rearward vane 134 and create a force and counter-clockwise torque as indicated by arrow A in FIG. 6, on the baffle 122. This extra force causes the dynamic baffle 122 to rotate in a counter-clockwise direction as illustrated and positions the forward vane 128 at a location to cut off a portion of the airflow to outlet 140 and redirect it to the outlet 138. In turn, the opposite rearward baffle 132 is moved into the air flow directed towards the higher resistance outlet 138, such that this air flow also exerts a force on the rearward vane 132 to rotate the baffle 122 in a clockwise direction. Eventually the system 120 will reach an equilibrium where the force exerted by the air flow on the rearward vane 134 of the dynamic baffle 122 will equal the force exerted by the air flow on the forward vane 128 and rearward vane 132 of the dynamic baffle 122. In this position, the baffle 122 will direct similar air flows into both outlets 138,140 for the supply lines 102. Further, when the increased resistance in the line 102 attached to outlet 138 dissipates or is otherwise removed, the resistance between the outlets will equalize and the baffles 122 will return to the configuration of FIG. 5 to direct the air flow evenly between the outlets 138,140.

Looking now at FIGS. 7 and 8, in another exemplary embodiment for the system 120, the system 120 construction can be varied to accommodate additional outlets 138, 140, 144 on the plenum 104 for additional supply lines 102. An additional baffle 122' with shaft 124', forward vane 128' and rearward vanes 132', 134' is positioned within the plenum 104 for a plenum 104 having three outlets 138, 140, 144, with each baffle 122, 122' being moved towards the outlets 138, 140, 144 and away from the inlet 130 of the plenum 104. With equal resistance in the each of the supply lines 102, the dynamic baffles 122,122' resort to the symmetric neutral position illustrated in FIG. 7 to direct air flow evenly to each of the outlets 138, 140, 144.

Conversely, in a situation where unequal resistances in the lines 102 causes line 102 connected to outlet 144 to have the most airflow and outlet 138 to have the least, the air flow differential operates to rotate the dynamic baffle 122' counter-clockwise due to the added force of the surplus airflow on rearward vane 134'. This rotation position the forward vane 128' of baffle 122' in a position to re-direct more airflow in conjunction with the rearward vane 132' to the outlet 140. The added airflow to outlet 140 consequently causes the dynamic baffle 122 to rotate counter-clockwise due to the added force caused by the surplus airflow to outlet 140 on the rearward vane 134 of the baffle 122. This rotation positions the forward vane 128 on the baffle 122 to redirect flow with the rearward vane 132 to the outlet 138. The position of the baffles 122, 122' in the system 120 will reach equilibrium when the forces exerted by the air flows on either side of each of the dynamic baffles 122 and 122' are equal, though the actual forces acting on each baffle 122, 122' may not be equal, as shown in FIG. 8.

Figure 10:
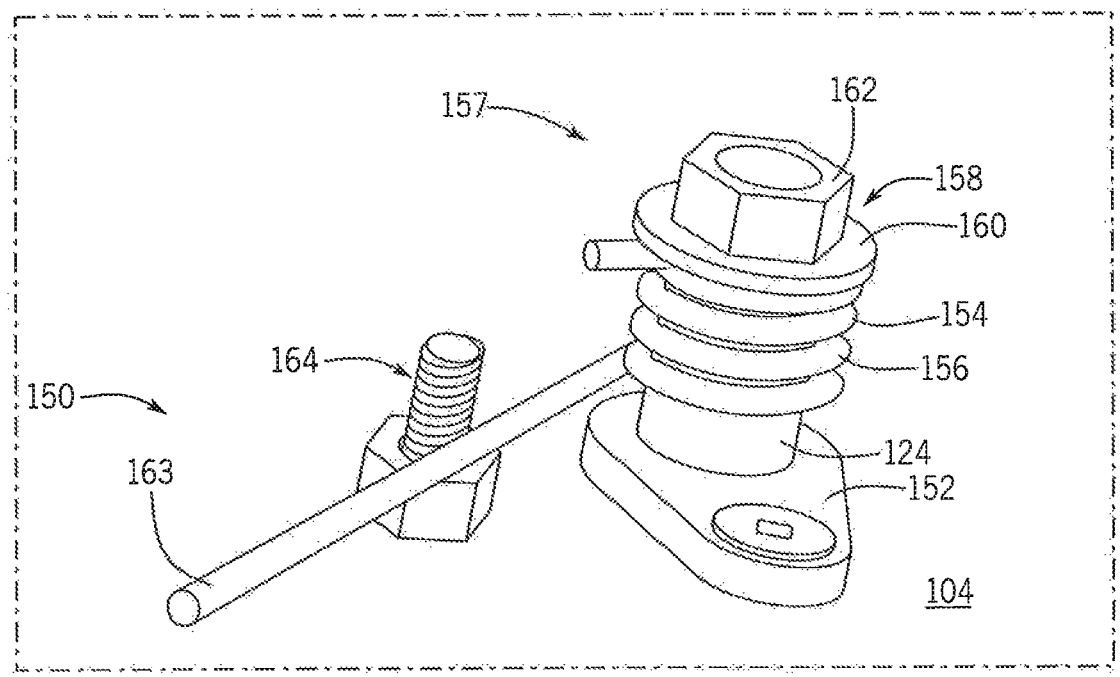

In an alternative embodiment of the baffle system 120, as illustrated in the exemplary embodiment of FIG. 10 a dampening mechanism 150 can be employed on the dynamic baffle(s) 122, 122' to reduce the hunting or chatter and sporadic back and forth motion of the baffle(s) 122, 122' that may occur with changing airflows. The dampening mechanism 150 can be secured to either side of the shafts 124, 124' of the dynamic baffle(s) 122, 122' and in the exemplary embodiment is disposed on the exterior of the plenum 104. The shafts 124, 124' of the baffle(s) 122,122' rotates with respect to the plenum 104 using bearings 152 secured to opposed ends of the shafts 124, 124' on either exterior side of the plenum 104. A biasing member 154, such as a rotary oil damper (not shown) or a torsion spring 156, is installed on one end of the shafts 124, 124' and operates to oppose movement of the baffle 122, 122' in one rotational direction. In the illustrated exemplary embodiment, the torsion spring 156 is engaged with the shafts 124, 124' at one end 157, such as by inserting the spring 156 into a slot or through a bore in the shafts 124, 124'. To secure this end 157 of the spring 156 to the shafts 124, 124', a locking mechanism 158, such as a washer 160 and/or nut 162 can be engaged with the shafts 124, 124' to hold the torsion spring 156 in position.

The opposed end 163 of the spring 156 extends outwardly away from the shafts 124, 124' and contacts a stop 164 that is disposed on the exterior of the plenum 104 but is spaced from the shafts 124, 124'. The stop 164 prevents the spring 156 from spinning with the shafts 124, 124', such that any rotation of the baffle 122,122', and thus the shafts 124, 124', is directly opposed by the force of the spring 156. The amount of force exerted on the shafts 124, 124' by the spring 156 is tailored to enable the shafts 124, 124' to rotate when a sufficient air flow differential between outlets 138, 140 and/or 144 is sensed by the baffle(s) 122, 122' within the plenum 104. In the exemplary embodiment of FIG. 10, the torsion spring 156 offers resistance in one rotational direction for the baffle(s) 122, 122'. However, in another exemplary embodiment the dampening mechanism 150 can be installed on both ends of the shafts 124, 124' to provide balanced rotational resistance to the baffle(s) 122, 122' in both directions.

In an additional exemplary embodiment, the dampening mechanism 150 can be a mechanical mechanism that can be operated to move the baffles 122 and/or 122' in any embodiment to a desired position to alter the air flow within the plenum 104 in a desired manner. In this embodiment, the dampening mechanism 150 can be selectively operated by an operator to adjust the system 120 to provide the desired airflow, which may or may not be a balanced air flow between the outlets 130, 140 and/or 144 based on the ability of the mechanical dampening mechanism 150 to position the baffles 122, 122' at locations where the air flow determined by the baffles 122, 122' is not balanced.

While the pneumatic and/or mechanical conveying system 100 disclosed so far herein have been primarily with respect to fertilizer application equipment or applicator commonly referred to as a "floater", it should be understood that the advantages from the pneumatic and/or mechanical conveying system 100 disclosed herein can be obtained on other types of equipment for applying particulate materials/product in a field. Sowers of various types, such as a planter, drill or seeder, are known to include an applicator unit, such as a drill or seeder, and may include an air cart having one or more bulk tanks carrying fertilizer and/or seeds to be planted or sown. The pneumatic conveying system 100 disclosed herein can be provided on the planter, and one or more air/seed inductors on the air cart. If the air cart is then used with a planter of a different type, or with another type of particle application equipment, adjustments to the pneumatic conveying system 100 can be made without the need to adjust the air/seed inductor assembly on the air cart. Accordingly, switching from one crop to another crop or from one planter to another planter does not require major adjustment of the air/seed inductor assembly on the air cart.

In using a pneumatic conveying system 100 as disclosed herein, a variety of materials can be applied by a variety of different implements. The particulate material to be applied is contained in one or more compartments. The particulate material or materials are supplied from the tanks to the pneumatic conveying system 100 wherein the material or materials are conveyed to one or more particle injectors while being intermixed with one another. At the particle injector the conveyed product or products are provided in a metered flow and transferred to one or more particle delivery units, which can be a broadcast spreader, seeder for depositing seeds or other materials across the surface of soil, a row opener unit for depositing seeds or other material in rows, or the like.

Various other alternatives are contemplated as being within the scope of the following claims particularly pointing out and distinctly claiming the subject matter regarded as the invention.

We claim:

1. An agricultural product delivery system, comprising:
at least one particulate material supply compartment;
a number of delivery units for applying particulate material from the at least one particulate material supply compartment; and
a pneumatic conveying system providing a mixed flow of particulate material from the at least one particulate material supply compartment to the particle delivery units, the conveying system comprising:
an airflow source;
a number of supply lines each operably connected to the airflow source at one end, to the at least one particulate material supply compartment and to at least one of the particle delivery units at the opposite end;
a plenum interconnected between the air flow source and the number of supply lines; and
a dynamic baffle system disposed between air flow source and the number of supply lines, the dynamic baffle system including at least one baffle received within an interior of the plenum, having a plurality of vanes projecting radially from a vertical axis passing through the interior of the plenum, and being rotatable about the vertical axis.

2. An agricultural product delivery system, comprising:
at least one particulate material supply compartment;
a number of delivery units for applying particulate material from the at least one particulate material supply compartment; and
a pneumatic conveying system providing a mixed flow of particulate material from the at least one particulate material supply compartment to the particle delivery units, the conveying system comprising:
an airflow source;
a number of supply lines each operably connected to the airflow source at one end, to the at least one particulate material supply compartment and to at least one of the particle delivery units at the opposite end; and
a dynamic baffle system disposed between air flow source and the number of supply lines;
wherein:
the dynamic baffle system comprises:
a plenum interconnected between the air flow source and the number of supply lines; and
at least one baffle rotatably mounted within an interior of the plenum; and
the at least one baffle comprises:
a central shaft rotatably mounted to the interior of the plenum;
a forward vane extending outwardly from the shaft; and
a pair of rearward vanes extending outwardly from the shaft generally opposite the forward vane.

3. The agricultural product delivery system of claim 2 wherein the pair of rearward vanes are spaced from one another.

4. The agricultural product delivery system of claim 2 further comprising a separator plate disposed within the interior of the plenum and spaced from the at least one baffle.

5. The agricultural product delivery system of claim 1, wherein the at least one baffle is disposed adjacent an inlet end of the plenum.

6. An agricultural product delivery system, comprising:
at least one particulate material supply compartment;
a number of delivery units for applying particulate material from the at least one particulate material supply compartment; and
a pneumatic conveying system providing a mixed flow of particulate material from the at least one particulate material supply compartment to the particle delivery units, the conveying system comprising:
an airflow source;
a number of supply lines each operably connected to the airflow source at one end, to the at least one particulate material supply compartment and to at least one of the particle delivery units at the opposite end; and
a dynamic baffle system disposed between air flow source and the number of supply lines;
wherein:
the dynamic baffle system comprises:
a plenum interconnected between the air flow source and the number of supply lines; and
at least one baffle rotatably mounted within an interior of the plenum;
a first baffle is rotatably mounted within an interior of the plenum; and
a second baffle is rotatably mounted within an interior of the plenum and spaced from the first baffle.

7. The agricultural product delivery system of claim 6 wherein the first baffle and the second baffle are disposed adjacent an outlet end for the plenum.

8. The agricultural product delivery system of claim 1 further comprising a dampening mechanism operably connected to the at least one baffle.

9. The agricultural product delivery system of claim 8 wherein the dampening mechanism comprises:
a biasing member having a first end engaged with the at least one baffle and a second end extending outwardly from the first end; and
a stop spaced from the at least one baffle and engaged with the second end of the biasing member.

10. An agricultural product delivery system, comprising:
at least one particulate material supply compartment;
a number of delivery units for applying particulate material from the at least one particulate material supply compartment; and
a pneumatic conveying system providing a mixed flow of particulate material from the at least one particulate material supply compartment to the particle delivery units, the conveying system comprising:
an airflow source;
a number of supply lines each operably connected to the airflow source at one end, to the at least one particulate material supply compartment and to at least one of the particle delivery units at the opposite end; and
a dynamic baffle system disposed between air flow source and the number of supply lines;
wherein:
the dynamic baffle system comprises:
a plenum interconnected between the air flow source and the number of supply lines; and
at least one baffle rotatably mounted within an interior of the plenum;
a dampening mechanism is operably connected to the at least one baffle, the dampening mechanism comprises:
a biasing member having a first end engaged with the at least one baffle and a second end extending outwardly from the first end; and
a stop spaced from the at least one baffle and engaged with the second end of the biasing member; and
the biasing member is a torsion spring.

11. An agricultural product delivery system, comprising:
at least one particulate material supply compartment;
a number of delivery units for applying particulate material from the at least one particulate material supply compartment; and
a pneumatic conveying system providing a mixed flow of particulate material from the at least one particulate material supply compartment to the particle deliver units, the conveying system comprising:
an airflow source;
a number of supply lines each operably connected to the airflow source at one end, to the at least one particulate material supply compartment and to at least one of the particle delivery units at the opposite end; and
a dynamic baffle system disposed between air flow source and the number of supply lines;
wherein:
the dynamic baffle system comprises:
a plenum interconnected between the air flow source and the number of supply lines; and at least one baffle rotatably mounted within an interior of the plenum; and the pneumatic conveying system comprises:
  a first airflow source connected to a first portion of the supply lines;
  a first dynamic baffle system interconnected between the first air flow source and the first portion of the supply lines;
  a second airflow source connected to a second portion of the supply lines and
  a second dynamic baffle system interconnected between the second air flow source and the second portion of the supply lines.

12. The agricultural product delivery system of claim 11 wherein the number of supply lines forming the first portion of the supply lines and the second portion of the supply lines are not equal.

* * * * *